(12) United States Patent
Perry et al.

(10) Patent No.: US 11,433,765 B2
(45) Date of Patent: Sep. 6, 2022

(54) COMMERCIAL VEHICLE WITH ELECTRIC DRIVEN AXLE

(71) Applicant: DANA HEAVY VEHICLE SYSTEMS GROUP, LLC, Maumee, OH (US)

(72) Inventors: Joshua A. Perry, Maumee, OH (US); William F. Waltz, Toledo, OH (US); George A. Willford, Waterville, OH (US); James F. Ziech, Kalamazoo, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 480 days.

(21) Appl. No.: 16/487,711

(22) PCT Filed: Feb. 22, 2018

(86) PCT No.: PCT/US2018/019141
§ 371 (c)(1),
(2) Date: Aug. 21, 2019

(87) PCT Pub. No.: WO2018/156706
PCT Pub. Date: Aug. 30, 2018

(65) Prior Publication Data
US 2020/0031224 A1    Jan. 30, 2020

Related U.S. Application Data

(60) Provisional application No. 62/511,708, filed on May 26, 2017, provisional application No. 62/462,106, filed on Feb. 22, 2017.

(51) Int. Cl.
*B60K 17/34* (2006.01)
*B60K 17/08* (2006.01)
(Continued)

(52) U.S. Cl.
CPC ............. *B60K 17/346* (2013.01); *B60K 1/02* (2013.01); *B60K 7/0007* (2013.01);
(Continued)

(58) Field of Classification Search
CPC ...... B60K 17/346; B60K 1/02; B60K 7/0007; B60K 17/043; B60K 17/08; B60K 17/36;
(Continued)

(56) References Cited

U.S. PATENT DOCUMENTS

2002/0088291 A1* 7/2002 Bowen ................... B60W 20/40
903/917
2005/0164827 A1* 7/2005 Beaty .................... B60W 10/02
477/3
(Continued)

*Primary Examiner* — David R Morris
*Assistant Examiner* — Farhana Pervin
(74) *Attorney, Agent, or Firm* — McCoy Russell LLP (57) ABSTRACT

Provided herein is an electric axle including a differential assembly drivingly connected to a first axle half shaft and a second axle half shaft, wherein the first and second axle half shafts each have a wheel coupled to the ends thereof; an electric motor/generator drivingly connected to a first rotatable shaft; a first gear set having a first gear connected to the first rotatable shaft and a second gear connected to a second rotatable shaft; a second gear set having a first gear connected to the second rotatable shaft and a second gear selectively connected to a third rotatable shaft; a third gear set having a first gear connected to the third rotatable shaft and a second gear drivingly connected to the differential assembly; and a selector device configured to selectively connect the third rotatable shaft to the second gear of the second gear set or the first rotatable shaft.

9 Claims, 6 Drawing Sheets (51) Int. Cl.
  *B60K 17/346* (2006.01)
  *B60W 10/16* (2012.01)
  *H02K 7/00* (2006.01)
  *H02K 7/116* (2006.01)
  *B60K 1/02* (2006.01)
  *B60K 17/04* (2006.01)
  *B60K 17/36* (2006.01)
  *B60K 7/00* (2006.01)
  *B60K 1/00* (2006.01)

(52) U.S. Cl.
  CPC ............ *B60K 17/043* (2013.01); *B60K 17/08* (2013.01); *B60K 17/36* (2013.01); *B60W 10/16* (2013.01); *H02K 7/006* (2013.01); *H02K 7/116* (2013.01); *B60K 2001/001* (2013.01)

(58) Field of Classification Search
  CPC .. B60K 2001/001; B60K 17/26; B60K 23/08; B60K 17/22; B60W 10/16; H02K 7/006; H02K 7/116; F16H 3/08–78; F16H 2200/0034
  See application file for complete search history.

(56) References Cited

U.S. PATENT DOCUMENTS

| | | | |
|---|---|---|---|
| 2006/0021456 A1* | 2/2006 | Hughes | B60K 6/40 74/330 |
| 2007/0022835 A1* | 2/2007 | Kilian | B60K 6/442 74/330 |
| 2011/0094807 A1* | 4/2011 | Pruitt | B60L 50/40 180/65.6 |
| 2012/0304789 A1* | 12/2012 | Misu | B60K 6/48 74/331 |
| 2014/0000412 A1* | 1/2014 | Kaltenbach | B60K 6/547 903/902 |

* cited by examiner

COMMERCIAL VEHICLE WITH ELECTRIC DRIVEN AXLE

RELATED APPLICATION

This application claims the benefit of U.S. Provisional Application No. 62/462,106, filed Feb. 22, 2017 and U.S. Provisional Application No. 62/511,708 filed on May 26, 2017, which are herein incorporated herein by reference.

BACKGROUND

Hybrid vehicles are enjoying increased popularity and acceptance due in large part to the cost of fuel and greenhouse carbon emission government regulations for internal combustion engine vehicles. Such hybrid vehicles include both an internal combustion engine as well as an electric motor to propel the vehicle.

Commercial vehicles or trailers having two or more rear axles allow such vehicles to carry greater loads when compared to vehicles and trailers having a single axle. A typical six-wheel drive arrangement for a motor vehicle includes an axle having steerable wheels at the front end of the vehicle and tandem axles at the rear of the vehicle.

Traditional tandem axle systems include 6×4 drivelines (i.e. two wheels on the steer axle and four driving wheels on tandem axles behind the steer axle) or 6×2 drivelines (i.e. two wheels on the steer axle and four wheels on the tandem axles systems behind the steer axle where only two wheels are on a drive axle). Any axle in the tandem axle system may be a drive axle or a dead axle. When an additional axle (secondary axle) is a dead axle, it may be positioned before (a pusher axle) or after (a tag axle) a drive axle.

It may be useful and advantageous to have an electric tag axle with high reduction capabilities using an existing electric motor that is efficient and compact.

Additionally, it may be beneficial to have an electric driven axle and an engine driven axle on the same tandem axle assembly to allow the electric driven axle to supplement the torque and braking during power generation.

SUMMARY

Provided herein is an electric axle including a differential assembly drivingly connected to a first axle half shaft and a second axle half shaft, wherein the first and second axle half shafts each have a wheel coupled to the ends thereof; an electric motor/generator drivingly connected to a first rotatable shaft; a first gear set having a first gear connected to the first rotatable shaft and a second gear connected to a second rotatable shaft; a second gear set having a first gear connected to the second rotatable shaft and a second gear selectively connected to a third rotatable shaft; a third gear set having a first gear connected to the third rotatable shaft and a second gear drivingly connected to the differential assembly; and a selector device configured to selectively connect the third rotatable shaft to the second gear of the second gear set or the first rotatable shaft.

In some embodiments, the first rotatable shaft is transverse to the first and second axle half shafts.

In some embodiments, the electric axle further includes an axle disconnect device rotatably mounted to one of the first and second axle half shafts between the differential assembly and the wheel.

In some embodiments, the first gear set, second gear set and third gear set are reducing gear sets.

In some embodiments, the electric axle further includes least one over run clutches positioned on one of first and second axle haft shafts, between the differential assembly and the wheel on the end thereof.

In some embodiments, the first gear set, second gear set, third gear set and differential assembly are enclosed in a clamshell housing, wherein the first and second axle half shafts extend through the clamshell housing.

In some embodiments, at least one of the first, second and third gear sets is an epicyclic gear set.

In some embodiments, at least one of the first, second and third gear sets is a stepped gear set.

In some embodiments, the selector device includes a selector spline connected to the third rotatable shaft and a selector sleeve, wherein the selector sleeve is configured to engage the selector spline and one of the first rotatable shaft and the second gear of the second gear set.

Provided herein is a tandem axle assembly having a first driven axle, wherein the first driven axle is drivingly connected to an internal combustion engine; and a second driven axle, wherein the second driven axle is any of the preceding electric axles.

BRIEF DESCRIPTION OF THE DRAWINGS

Novel features are set forth with particularity in the appended claims. A better understanding of the features and advantages of the embodiments will be obtained by reference to the following detailed description that sets forth illustrative embodiments, in which the principles of the embodiments are utilized, and the accompanying drawings of which:

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments. Hence, specific dimensions, directions, orientations or other physical characteristics relating to the embodiments disclosed are not to be considered as limiting, unless expressly stated otherwise The preferred embodiments will now be described with reference to the accompanying figures. The terminology used in the descriptions below is not to be interpreted in any limited or restrictive manner simply because it is used in conjunction with detailed descriptions of certain specific embodiments. Furthermore, the embodiments include several novel features, no single one of which is solely responsible for its desirable attributes or which is essential to practicing the embodiments described.

Provided herein are electric powertrain configurations that may be used in hybrid and/or electric vehicles. The powertrain includes an electric tag/secondary axle having a motor/generator, multiple reducing gear passes mounted on co-axial parallel shafts or transverse shafts, and a differential assembly.

In some embodiments, the powertrains include disconnect features and over run clutches.

In some embodiments, the electric powertrains are part of electric axles which are incorporated into vehicles as tag or secondary axles in tandem or multiple axle vehicle systems.

Figure 1:
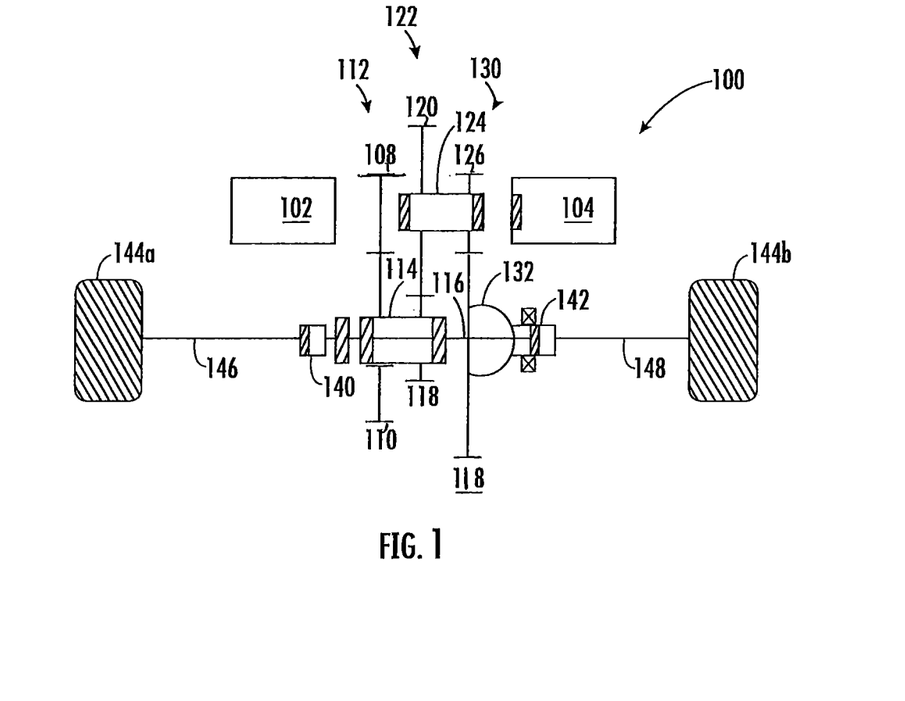
FIG. 1 is a schematic view of one preferred embodiment of an electric axle.

It should be understood that electric or hybrid electric vehicles incorporating embodiments of the powertrains disclosed herein are capable of including a number of other powertrain components, such as, but not limited to, high-voltage battery pack with a battery management system or ultracapacitor, on-board charger, DC-DC converters, a variety of sensors, actuators, and controllers, among others FIG. 1 is a schematic view of an electric axle 100 according to a preferred embodiment. The electric axle 100 is a motor/generator driven axle and may be operated in a plurality of operating modes.

Referring to FIG. 1, in some embodiments, the electric axle 100 includes a first electric motors/generator 102 drivingly connected to a rotatable shaft 106. Shaft 106 has a gear 108 rotatably mounted thereon. Gear 108 engages with a gear 110 to form a gear pass 112. Gear 110 is rotatably mounted on a rotatable shaft 114.

In some embodiments, the electric axle 100 includes a second electric motor/generator 104 drivingly connected to shaft 106.

In some embodiments, the second electric motor/generator 104 and the first electric motor/generator are positioned parallel to each other.

In some embodiments, shaft 114 is a hollow shaft co-axial with a rotatable shaft 116.

Shaft 114 further includes a gear 118 rotatably mounted thereon. Gear 118 engages with a gear 120 to forma gear pass 122. Gear 120 is rotatably mounted to a rotatable shaft 124.

In some embodiments, shaft 124 is a hollow rotatable shaft co-axial with shaft 106.

Shaft 124 further includes a gear 126 rotatably mounted thereon. Gear 126 engages with a gear 128 to form a gear pass 130. Gear 128 is drivingly connected to the differential assembly 132. The differential assembly 132 is drivingly connected to shaft 134 and shaft 116. Shaft 134 and shaft 116 extend radially outward from both sides of the differential assembly 132.

In some embodiments, the differential assembly 132 includes a common differential gear set implemented to transmit rotational power. In some embodiments, the differential assembly 132 is a standard bevel gear differential assembly.

In some embodiments, over run clutches 140, 142 are positioned on shafts 116, 134, respectively, between the differential assembly 132 and a set wheels 144a, 144b.

Coupled to each over run clutch 140, 142 is an axle half shaft 146, 148 which the wheels 144a, 144b respectively are drivingly connected thereto.

In some embodiments, the over run clutches 140, 142 are one directional clutches.

In some embodiments, the over run clutches 140, 142 are bi-directional clutches.

Figure 2:
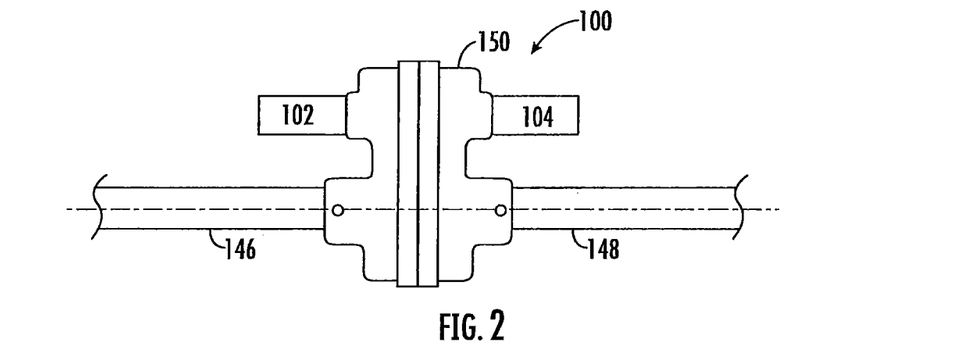
FIG. 2 is a top view of the electric axle including a housing of FIG. 1.

In some embodiments, the gear passes 112, 122, 130, shafts 106, 114, 116, 124, 134 and the differential assembly 132 and over run clutches 140, 142 are enclosed in a clamshell housing 150 with press in axle half shafts 146, 148 as shown in FIG. 2.

In some embodiments, the motor/generators 102, 104 are connected directly to the outside of the housing 150.

In some embodiments, gear passes 112, 122, 130 each provide a reduction ratio, for example, but not limited to, a 4.5:1 reduction ratio, while providing the electric axle 100 with a larger overall reduction, for example, but not limited to, a 90:1 reduction.

In some embodiments, at least of the gear passes 112, 122, 130 are epicyclic gear sets.

In some embodiments, at least one of the gear passes 112, 122, 120 are stepped gear sets.

In some embodiments, the axle 100 is provided as a tag or secondary axle of a tandem axle assembly.

In some embodiments, the motor/generators 102, 104 are capable of providing kinetic energy and converting a kinetic energy input to an electrical energy output (i.e. operate as a motor and a generator). More specifically, when the operator of the vehicle depresses the brake pedal the generator can covert the kinetic energy into electrical energy (i.e. regenerative braking).

In some embodiments, the motor/generators 102, 104 are connected to an energy storage device. The energy storage device can be a battery having a battery pack or a capacitor; however, it is understood that other embodiments may include other power sources including electrochemical energy conversion devices or combinations thereof including, but not limited to, an ultra-capacitor a fuel cell particularly in a fuel cell electric vehicle drivetrains (FCEV).

For any given wheel speed the first motor/generator 102 (or alternatively the second motor/generator 104) can operate as a motor providing power to the powertrain 100 and the second generator/generator 104 (or alternatively the first motor/generator 102) can operate as a generator. The generator 104 can maintain the state of charge in the battery pack or level of energy stored in the energy storage device at a sustainable or threshold level. By doing so, the energy storage device is able to provide the axle 100 energy for on-demand boosting launch assist for a vehicle with fast axle ratios if desire. The axle is energized at launch through vehicles speeds including, but not limited to, of 6 mph. If both the first and second motor/generators 102, 104 are operating as generators, the powertrain 100 provides a higher energy recuperation.

In some embodiments, the electric axle 100 includes a separate battery controller (not shown) as part of a battery management system (not shown).

In some embodiments, all components of the electric axle 100 are under the supervisory control of a vehicle system controller (VSC) not shown. Each axle component can have a separate controller under the supervisory control of the VSC.

In some embodiments, the controller and/or VSC is configured to receive a number of electronic signals from sensors provided on the axle, vehicle, wheels, etc. The sensors optionally include temperature sensors, speed sensors, position sensors, among others. In some embodiments, the controller and the VSC is configured to perform routines such as signal acquisition, signal arbitration, or other known methods for signal processing and is configured to electronically communicate to a variety of actuators and sensors.

Figure 3:
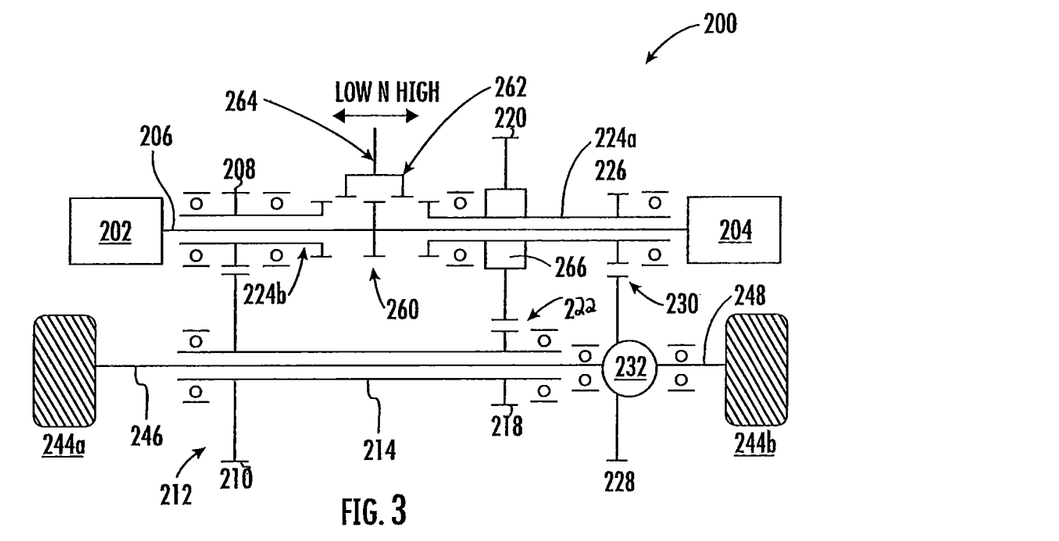
FIG. 3 is a schematic view of another preferred embodiment of an electric axle.

FIG. 3 depicts another preferred embodiment an electric axle 200. The embodiment shown in FIG. 3 includes similar components to the axle 100. Similar features of the embodiment shown in FIG. 1 are numbered similarly in series. Different and additional features of the variation shown in FIG. 3 are described hereinbelow and can be appreciated by one skilled in the art in view of FIG. 1 and the other embodiments illustrated and described in this disclosure.

Referring to FIG. 3, an electric axle 200 includes a drivetrain operably coupled to a differential assembly 232. In some embodiments, the differential assembly 232 includes a traditional bevel differential gear set implemented to transmit rotational power. The differential assembly 232 is operably coupled to axle half shafts 246, 248 configured to drive a set of vehicle wheels 244a, 244b on the ends thereof. The differential assembly 232 is drivingly connected to a gear pass 230.

A first electric motor/generator 202 is drivingly connected a rotatable shaft 206.

In some embodiments, the electric axle 200 includes a second electric motor/generator 204 drivingly connected to shaft 206.

In some embodiments, the second electric motor/generator 204 and the first electric motor/generator 202 are positioned parallel to each other.

In some embodiments, one electric motor/generator, 202 or 204, is a higher torque motor than the other electric motor/generator 204 or 202.

Shaft 206 has a selector spline 260 rotatingly attached thereto. A selector sleeve 262 slides on the selector spline 260 to engage a shaft 224a or a shaft 224b by means of a clutching action. Shafts 224a, 224b are hollow rotatable shafts co-axial with shaft 206. When neither shaft 224a nor shaft 224b is engaged, the selector sleeve 262 is in a neutral position. A shift fork 264 is used to engage the selector sleeve 262. The shift fork 264 can be operated by various means including, but not limited to, mechanical, hydraulic, pneumatic etc.

In some embodiments, a clutch can be used instead of a shift fork 264. The clutch can be, but is not limited to, a dog clutch, a clone clutch, a wet or dry clutch including a hydraulically actuated wet clutch pack.

In some embodiments, the shift fork 264 disposed in an annular recess formed in the selector sleeve 262 moves the selector sleeve 262 along the axis of shaft 206 into a first position, a second position, or a neutral position. In response to a signal sent by a controller, an actuator adjusts a position of the selector sleeve 262.

Shaft 224b has a gear 208 of a gear pass 212 rotatable mounted thereon. Gear 208 engages with gear 210 of gear pass 212. Gear 208 is rotatably mounted on a rotatable shaft 214. Shaft 214 is a hollow shaft co-axial with the axle haft shaft 246. Shaft 214 additionally has a gear 218 of a gear pass 222 rotatably mounted thereon. Gear 218 engages with gear 220 of gear pass 222.

Gear 220 is selectively connected to shaft 224a via an over run clutch 266. The over run clutch 266 is mounted to shaft 224a. A gear 226 is rotatably mounted on shaft 224a. Gear 226 engages with a gear 228 to form a gear pass 230. Gear 228 is drivingly connected to the output of the differential assembly 232.

In some embodiments, an axle disconnect device (not shown) is rotatably mounted to one output of the differential assembly 232 between the differential assembly 232 and the wheel 244a, 244b. The axle disconnect device is in communication with the battery and the control assembly or another controller.

If a low vehicle speed, high ratio range is desired the selector spline 260 is engaged with shaft 224b. Power is transferred from the motor/generators 202, 204 through the selector spline 260 to the hollow shaft 224b, to gear pass 212, to shaft 214 through gear pass 222 and through the over run clutch 266. The over run clutch 266 automatically engages in low vehicle speed and will transfer power to shaft 224a, to gear pass 230, to the differential assembly 232 and, thus, to the wheels 244a, 244b.

If a high vehicle speed, low ratio range is desired for regenerative braking the selector spline 260 is engaged with shaft 224a. Regenerative power is transferred from the wheels 244a, 244b through the axle half shafts 246, 248 to the differential assembly 232, to gear pass 230, to hollow shaft 224a that is connected to shaft 206 and the motor/generators 202, 204. The over run clutch 266 disconnects to the hollow shaft 224b preventing gear pass 220, shaft 214 and gear pass 212 from spinning.

At certain desired road speeds the selector sleeve 260 can be in a neutral position wherein no power will be transferred through the shaft 206 to shaft 224b and gear pass 230 to the differential assembly 232 to the wheels 244a, 244b of the vehicle.

In some embodiments, the axle half shafts 246, 248 may also be disconnected at an axle disconnect clutch (not shown) stopping all powertrain rotation from gear pass 230 up to and including the motor/generator 202.

In some embodiments, gear passes 212, 222, 230 each provide a reduction ratio. The electric axle 200 high overall ratio could be, but is not limited to, a 4.25:1 reduction ratio, while the electric axle 200 low overall ratio could be, but not limited to, a 90:1 reduction.

A controller or control system can control the operating mode of the axle 200 by at least by adjusting a position of the selector sleeve 262. In response to a signal sent by the controller, an actuator adjusts a position of the selector sleeve 262.

Figure 4:
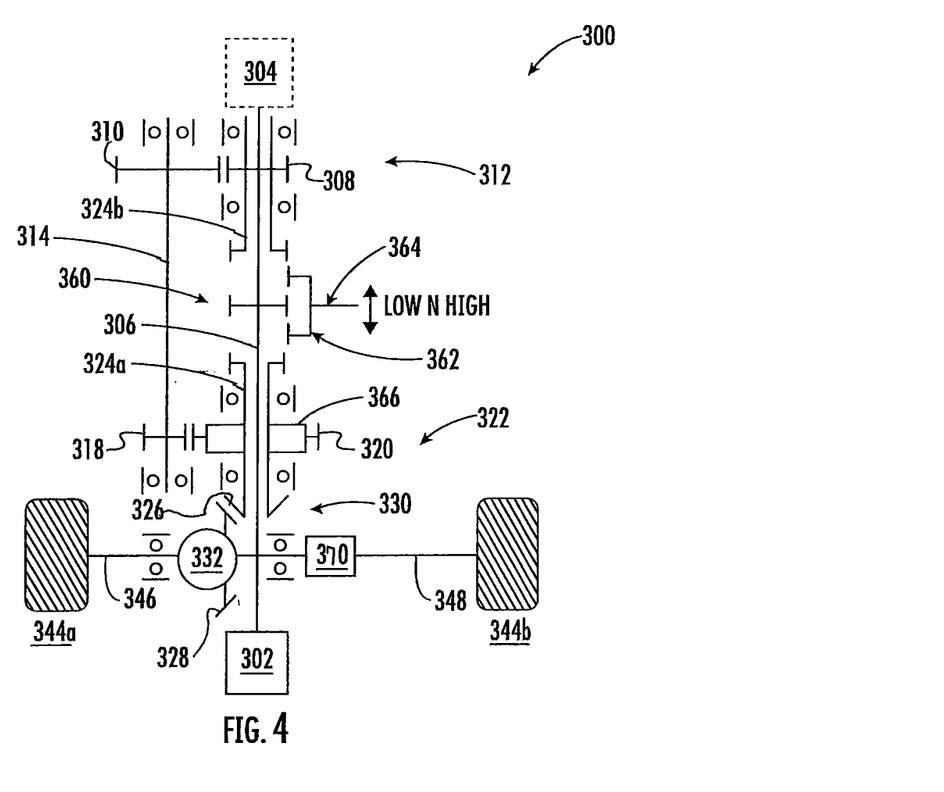
FIG. 4 is a schematic view of another preferred embodiment of an electric axle.

FIG. 4 depicts another preferred embodiment an electric axle 300. The embodiment shown in FIG. 4 includes similar components to the axle 100. Similar features of the embodiment shown in FIG. 1 are numbered similarly in series. Different and additional features of the variation shown in FIG. 4 are described hereinbelow and can be appreciated by one skilled in the art in view of FIG. 1 and the other embodiments illustrated and described in this disclosure.

Referring to FIG. 4, in some embodiments, the electric axle 300 includes a drivetrain operably coupled to a differential assembly 332.

In some embodiments, the differential assembly 332 includes a traditional bevel differential gear set implemented to transmit rotational power.

The differential assembly 332 is operably coupled axle half shafts 346, 348 configured to drive a set of vehicle wheels 344a, 344b on the ends thereof. The differential assembly 332 is drivingly connected to a gear pass 330.

A first electric motor/generator 302 is drivingly connected to a rotatable shaft 306.

In some embodiments, the electric axle 300 includes a second electric motor/generator 304 drivingly connected to shaft 306.

In some embodiments, the second electric motor/generator 304 and the first electric motor/generator 302 are positioned parallel to each other.

Shaft 306 is connected to and extends perpendicular to axle half shaft 346.

In some embodiments, one electric motor/generator 302, 304 is a higher torque motor than the other electric motor/generator 302, 304.

Shaft 306 has a selector spline 360 rotatingly attached thereto. A selector sleeve 362 slides on the selector spline 360 to engage a shaft 324a or a shaft 324b by means of a clutching action. Shafts 324a and 324b are hollow rotatable shafts co-axial with shaft 306. When neither shaft 324a nor shaft 324b is engaged, the selector sleeve 362 is in a neutral position. A shift fork 364 is used to engage the selector sleeve 362. The shift fork 364 can be operated by various means including, but not limited to, mechanical, hydraulic, pneumatic etc.

In some embodiments, the shift fork 364 can be replaced with a clutching device. The clutch can be, but is not limited to, a dog clutch, a clone clutch, a wet or dry clutch including a hydraulically actuated wet clutch pack.

In some embodiments, the shift fork 356 disposed in an annular recess formed in the selector sleeve 362 moves the selector sleeve 232 along the axis of shaft 306 into a first position, a second position, or a neutral position. In response to a signal sent by a controller, an actuator adjusts a position of the selector sleeve 362.

Shaft 324b has a gear 308 of a gear pass 312 rotatable mounted thereon. Gear 308 engages with gear 310 of gear pass 312. Gear 310 is rotatably mounted on a rotatable shaft 314. Shaft 314 additionally has a gear 318 of a gear pass 322 rotatably mounted thereon. Gear 318 engages with gear 320 of gear pass 322.

An axle disconnect device 370 is rotatably mounted to one of the differential assembly 332 outputs.

Gear 320 is selectively connected to shaft 324a via an over run clutch 366. The over run clutch 366 is mounted to shaft 324a. A gear 326 is rotatably mounted on shaft 324a. Gear 326 engages with a gear 328 to form a gear pass 330. Gear 328 is drivingly connected to the differential assembly 332.

If a low vehicle speed, high ratio range is desired the selector spline 360 is engaged with shaft 324b. The power is transferred from the motor/generators 302, 304 through the selector spline 360 to the hollow shaft 324b, to gear pass 312, to shaft 314 through gear pass 322 and through the over run clutch 366.

If a high vehicle speed, low ratio range is desired for regenerative braking the selector spline 360 is engaged with shaft 324a. Regenerative power is transferred from the wheels 344a, 344b through the axle half shaft 346, 348 to the differential assembly 332, to gear pass 330, to hollow shaft 324a that is connected to shaft 306 and the motor/generators 302, 304. The over run clutch 366 disconnects to the hollow shaft 324a, preventing gear pass 322, shaft 314 and gear pass 312 from spinning. The over run clutch 366 automatically engages in low vehicle speed and it will transfer power to shaft 324a, to gear pass 330, to the differential assembly 332 and, thus, to the wheels 344a, 344b.

At certain desired road speeds the selector sleeve 360 can be in a neutral position wherein no power will be transferred through the shaft 306 to shaft 324a and the gear pass 330 to the differential assembly 332 to the wheels 344a, 344b of the vehicle.

The axle half shaft 346, 348 may also be disconnected by the axle disconnect device 370 stopping all powertrain rotation from gear pass 330 up to and including the electric motor/generator 302.

Figure 5:
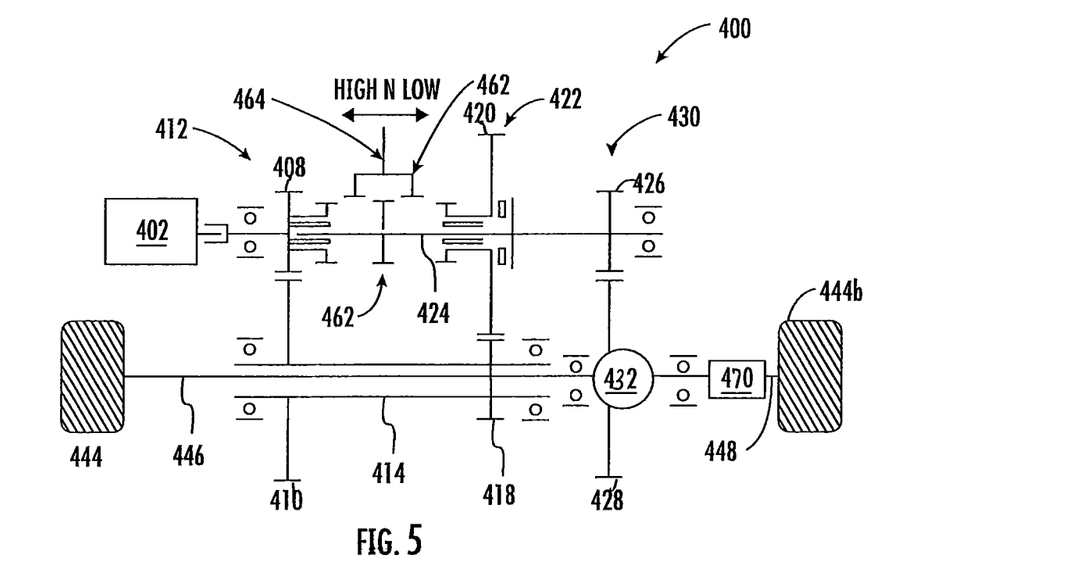
FIG. 5 is a schematic view of another preferred embodiment of an electric axle.

FIG. 5 depicts another preferred embodiment an electric axle 400. The embodiment shown in FIG. 5 includes similar components to the axle 300. Similar features of the embodiment shown in FIG. 4 are numbered similarly in series. Different and additional features of the variation shown in FIG. 5 are described hereinbelow and can be appreciated by one skilled in the art in view of FIG. 4 and the other embodiments illustrated and described in this disclosure.

Referring to FIG. 5, in some embodiments, an electric axle 400 includes a drivetrain operably coupled to a differential assembly 432.

In some embodiments, the differential assembly 432 includes a traditional bevel differential gear set implemented to transmit rotational power.

The differential assembly 432 is operably coupled to axle half shafts 446, 448 configured to drive a set of vehicle wheels 444a, 444b on the ends thereof. The differential assembly 432 is drivingly connected to a gear pass 430.

A first electric motor/generator 402 is drivingly connected to a rotatable shaft 406. Shaft 406 extends parallel to axle half shafts 446, 448. A shaft 424 has a selector spline 460 rotatingly attached thereto. A selector sleeve 462 slides on the selector spline and can engage with a shaft 406 or a gear 420. When neither shaft 406 nor gear 428 is engaged, the selector sleeve 462 is in a neutral position. A shift fork 464 is used to engage the selector sleeve 462.

The shift fork 464 can be operated by various means including, but not limited to, mechanical, hydraulic, pneumatic etc.

In some embodiments, the shift fork 464 disposed in an annular recess formed in the selector sleeve 462 moves the selector sleeve 462 along the axis of shaft 424 into a first position, a second position, or a neutral position. In response to a signal sent by a controller, an actuator adjusts a position of the selector sleeve 462.

In some embodiments, a clutch can be used instead of the shift fork 464. The clutch can be, but is not limited to, a dog clutch, a clone clutch, a wet or dry clutch including a hydraulically actuated wet clutch pack.

A gear 408 of a gear pass 412 rotatable mounted thereon to shaft 406. Gear 408 engages with a gear 410 of gear pass 412. Gear 410 is rotatably mounted on a rotatable shaft 414. Shaft 414 is a hollow shaft co-axial with axle haft shaft 4446, 448. Shaft 414 additionally has a gear 418 of a gear pass 422 rotatably mounted thereon. Gear 418 engages with gear 420 of gear pass 422. A gear 426 is rotatably mounted on shaft 424. Gear 426 engages with a gear 428 to form a gear pass 430. Gear 428 is drivingly connected to the differential assembly 432.

In some embodiments, an axle disconnect device 470 is rotatably mounted to one output of the differential assembly 432 between the differential and the wheel 444a, 444b.

If a low vehicle speed, high ratio range is desired the selector spline 460 is engaged with gear 420. The power is transferred from the motor/generator to gear pass 412, to shaft 414, then to gear 420 of gear pass 422, through the selector spline 460 to shaft 424. Additionally, power will transfer to the differential assembly 432 and, thus, to the wheels 444a, 444b through axle half shafts 446, 448.

If a high vehicle speed, low ratio range is desired, the selector spline 460 is engaged with shaft 406. Power is transferred through shaft 406 to shaft 424. Additionally, power will transfer to the differential assembly 432 through gear pass 430 and, thus, to the wheels 444a, 444b through the axle half shaft 446, 448.

At certain desired road speeds the selector sleeve 462 can be in a neutral position wherein no power will be transferred through shaft 406 to shaft 424 and the gear pass 430 to the differential assembly 432 and to the wheels 444a, 444b of the vehicle.

In some embodiments, the axle half shaft 448 may also be disconnected at the axle disconnect clutch 470 stopping all rotation from gear pass 430 up to and including the electric motor/generator 402.

Figure 6:
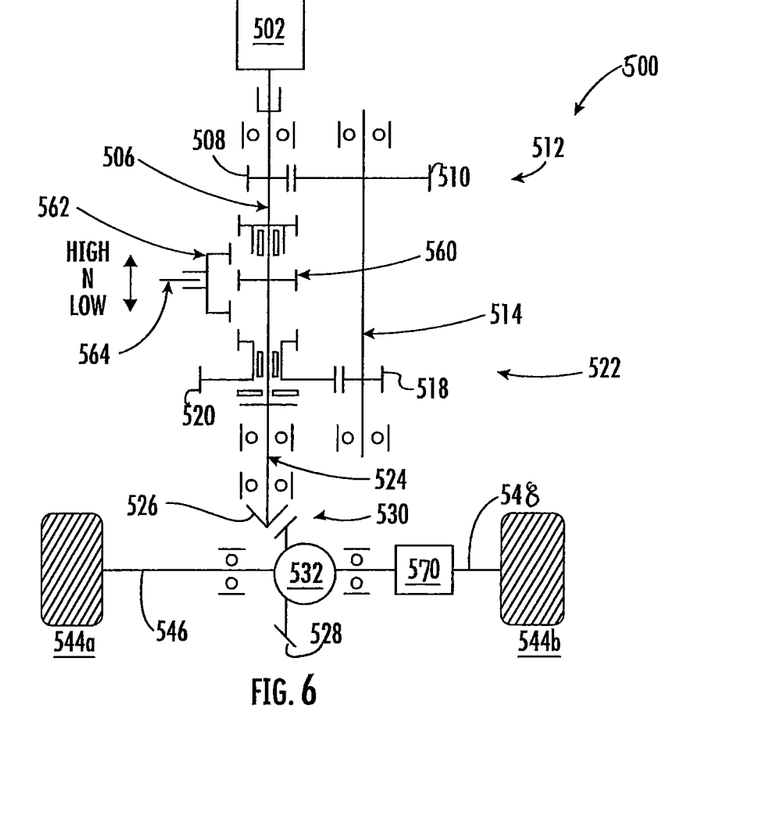
FIG. 6 is a schematic view of another preferred embodiment of an electric axle.

FIG. 6 depicts another preferred embodiment an electric axle 500. The embodiment shown in FIG. 6 includes similar components to the axle 500. Similar features of the embodiment shown in FIG. 5 are numbered similarly in series. Different and additional features of the variation shown in FIG. 6 are described hereinbelow and can be appreciated by one skilled in the art in view of FIG. 5 and the other embodiments illustrated and described in this disclosure.

Referring to FIG. 6, in some embodiments, the electric axle 500 includes a drivetrain operably coupled to a differential assembly 532. The differential assembly 532 is operably coupled to axle half shaft 546, 548, configured to drive a set of vehicle wheels 544a, 544b on the ends thereof. The differential assembly 532 is drivingly connected to a gear pass 530.

In some embodiments, the differential assembly 532 includes a traditional bevel differential gear set implemented to transmit rotational power.

A first electric motor/generator 502 is drivingly connected to a rotatable shaft 506. Shaft 506 extends perpendicular to axle half shafts 546, 548. Shaft 524 has a selector spline 560 rotatingly attached thereto. A selector sleeve 562 slides on the selector spline 560 to engage with a shaft 506 or a gear 520 by means of a clutching action. When neither shaft 506 nor gear 520 is engaged, the selector sleeve 562 is in a neutral position. A shift fork 564 is used to engage the selector sleeve 562. The shift fork 564 can be operated by various means including, but not limited to, mechanical, hydraulic, pneumatic etc.

In some embodiments, the shift fork 564 disposed in an annular recess formed in the selector sleeve 562 moves the selector sleeve 562 along the axis of shaft 524 into a first position, a second position, or a neutral position. In response to a signal sent by a controller, an actuator adjusts a position of the selector sleeve 562.

In some embodiments, a clutch can be used instead of the shift fork 564. The clutch can be, but is not limited to, a dog clutch, a clone clutch, a wet or dry clutch including a hydraulically actuated wet clutch pack.

A gear 508 of a gear pass 512 is ratably connected to shaft 506. Gear 508 engages with gear 510 of gear pass 512. Gear 510 is rotatably mounted on a rotatable shaft 514. Shaft 514 additionally has a gear 518 of a gear pass 520 rotatably mounted thereon. Gear 518 engages with gear 520 of gear pass 522.

A gear 526 is rotatably mounted on shaft 524. Gear 526 engages with a gear 528 to form a gear pass 530. Gear 528 is drivingly connected to the differential assembly 532.

In some embodiments, an axle disconnect device 570 is rotatably mounted to one of the axle half shaft 546, 548 between the differential assembly 532 and the wheel 544a, 544b.

If a low vehicle speed, high ratio range is desired the selector spline 560 is engaged with gear 520. The power is transferred from the motor/generator 502 through-gear pass 512 to shaft 514, through gear pass 522 through the selector spline 560 to shaft 524. Additionally, power will transfer to the differential assembly 532 through gear pass 530 and, thus, to the wheels 544a, 544b.

If a high vehicle speed, low ratio range is desired, the selector spline 560 is engaged with shaft 506. Power is transferred through shaft 506 to shaft 524. Additionally, power will transfer to the differential assembly 532 through gear pass 530 and, thus, to the wheels 544a, 544b.

At certain desired road speeds the selector sleeve 562 can be in a neutral position wherein no power will be transferred through shaft 506 to shaft 524 and the gear pass 530 to the differential assembly 532 and to the wheels 544a, 544b.

In some embodiments, the axle half shaft 546, 548 may be disconnected at the axle disconnect device 570 stopping all powertrain rotation from 530 up to and including the electric motor/generator 502.

Figure 7:
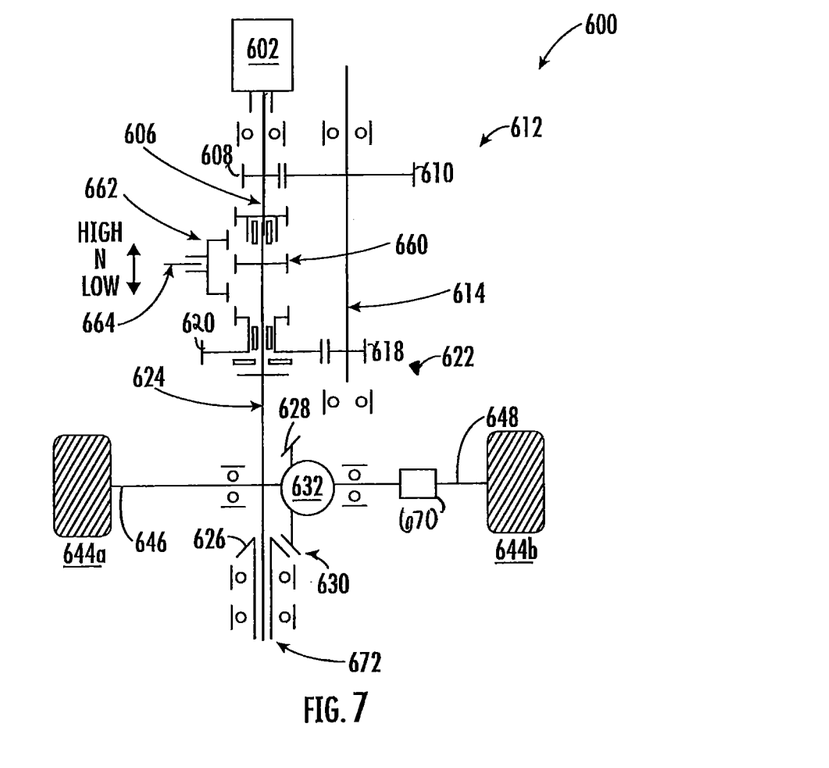
FIG. 7 is a schematic view of another preferred embodiment of an electric axle

FIG. 7 depicts another preferred embodiment an electric axle 600. The embodiment shown in FIG. 7 includes similar components to the axle 500. Similar features of the embodiment shown in FIG. 6 are numbered similarly in series. Different and additional features of the variation shown in FIG. 7 are described hereinbelow and can be appreciated by one skilled in the art in view of FIG. 6 and the other embodiments illustrated and described in this disclosure.

Referring to FIG. 7, in some embodiments, the electric axle 600 includes a drivetrain operably coupled to a differential assembly 632. The differential assembly 632 is operably coupled to axle half shafts 646, 648 configured to drive a set of vehicle wheels 644a, 644b on the ends thereof. The differential assembly 632 is drivingly connected to a gear pass 630.

In some embodiments, the differential assembly 632 includes a traditional bevel differential gear set implemented to transmit rotational power.

A first electric motor/generator 602 is drivingly connected a rotatable shaft 606. Shaft 606 extends perpendicular to the axle half shaft 646, 648. A shaft 624 is drivingly connected to a shaft 672 which is rotatably coupled to a gear 626. The differential assembly 632 can be connected to shaft 672 on either side axially of the differential assembly 632.

Shaft 624 has a selector spline 660 rotatingly attached thereto. A selector sleeve 662 slides on the selector spline 660 and can engage a shaft 606 or a gear 620 by means of a clutching action. When neither shaft 606 nor gear 620 is engaged, the selector sleeve 662 is in a neutral position. A shift fork 664 is used to engage the selector sleeve 662. The shift fork 664 can be operated by various means including, but not limited to, mechanical, hydraulic, pneumatic etc.

In some embodiments, the shift fork 664 disposed in an annular recess formed in the selector sleeve 662 moves the selector sleeve 662 along the axis of shaft 624 into a first position, a second position, or a neutral position. In response to a signal sent by a controller, an actuator adjusts a position of the selector sleeve 662.

In some embodiments, a clutch can be used instead of the shift fork 664. The clutch can be, but is not limited to, a dog clutch, a clone clutch, a wet or dry clutch including a hydraulically actuated wet clutch pack.

A gear 608 of a gear pass 612 is rotatably connected to shaft 606. Gear 608 engages with gear 610 of gear pass 612. Gear 610 is rotatably mounted on a rotatable shaft 614. Shaft 614 additionally has a gear 618 of a gear pass 622 rotatably mounted thereon. Gear 618 engages with gear 620 of gear pass 622.

Shaft 672 is coaxial with shaft 624. A gear 626 is rotatably mounted on shaft 672. Gear 672 engages with a gear 628 to form a gear pass 630. Gear 628 is drivingly connected to the differential assembly 632.

In some embodiments, an axle disconnect device 670 is rotatably mounted on one of the axle half shaft 646,648 between the differential and the wheel 644a, 644b.

If a low vehicle speed, high ratio range is desired the selector spline 660 is engaged with gear 620. The power is transferred from the motor/generator 602, 604 through gear pass 612 to shaft 614, through gear pass 622, through the selector spline 660 to shaft 624. Additionally, power will transfer to the differential assembly 632 through 630 and thus, to the wheels 644a, 644b through the axle half shafts 646, 648.

If a high vehicle speed, low ratio range is desired, the selector spline 660 is engaged with shaft 606. Power is transferred through shaft 606 to shaft 624. Additionally, power will transfer to the differential assembly 632 through 630 and thus, to the wheels 644a, 644b through the axle half shafts 646, 648.

At certain desired road speeds the selector sleeve 662 can be in a neutral position wherein no power will be transferred to the wheels 644a, 644b of the vehicle.

In some embodiments, the axle half shafts 646, 648 may also be disconnected at the axle disconnect device 670 stopping all powertrain rotation from 624 up to and including the electric motor/generator 602.

Figure 8:
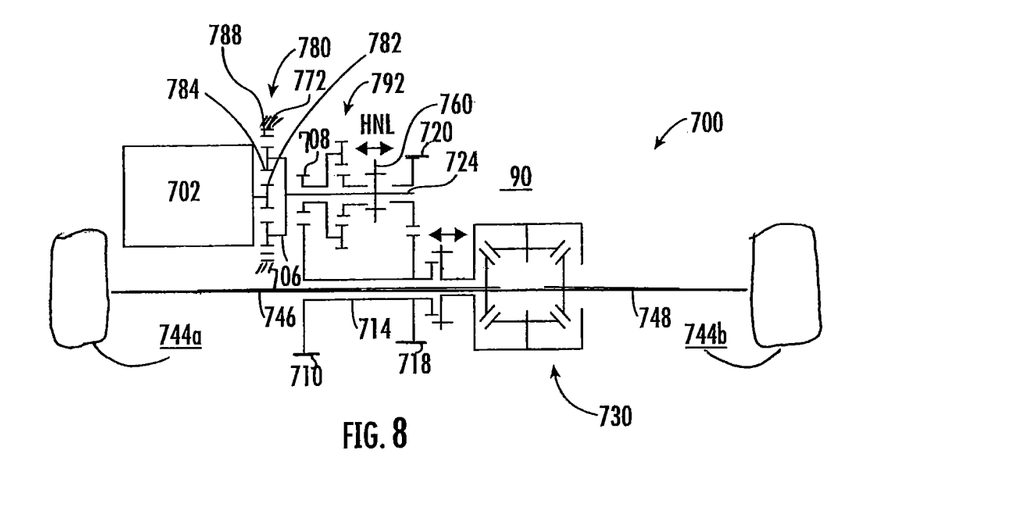
FIG. 8 is a schematic view of another preferred embodiment of an electric axle

FIG. 8 depicts another preferred embodiment an electric axle 700. The embodiment shown in FIG. 8 includes similar components to the axle 400. Similar features of the embodiment shown in FIG. 3 are numbered similarly in series. Different and additional features of the variation shown in FIG. 8 are described hereinbelow and can be appreciated by one skilled in the art in view of FIG. 3 and the other embodiments illustrated and described in this disclosure.

Referring to FIG. 8, in some embodiments, the electric axle 700 includes a drivetrain operably coupled to a differential assembly 732. The differential assembly 732 is operably coupled to axle half shaft 746, 748 configured to drive a set of vehicle wheels 744a, 744b on the ends thereof. The differential assembly 732 is selectively drivingly connected to a rotatable shaft 714. The rotatable shaft 714 is coaxial with axle half shafts 746, 748.

In some embodiments, the differential assembly 732 includes a traditional bevel differential gear set implemented to transmit rotational power.

A first electric motor/generator 702 is drivingly connected to a planetary gear set 780 through a rotatable shaft 706.

In some embodiments, the planetary gear set 780 including sun gear 782, drivingly engaged to a set of planet gears 784, a carrier 786, and a ring gear 788, engaged by the planet gears 784. The ring gear 788 is grounded to a stationary member or housing 772.

Shaft 706 is drivingly connected to the carrier 786.

The differential assembly 732 is selectively connected to a rotatable shaft 714 through the use of disconnect clutch 790.

A rotatable shaft 724 has a selector spline 760 rotatingly attached thereto. A selector sleeve 762 slides on the selector spline 760 and can engage a gear set 792 or a gear 720 by means of a clutching action. When neither gear set 792 nor gear 720 is engaged, the selector sleeve 762 is in a neutral position. A shift fork 764 is used to engage the selector sleeve 762. The shift fork 764 can be operated by various means including, but not limited to, mechanical, hydraulic, pneumatic etc.

In some embodiments, the shift fork 764 disposed in an annular recess formed in the selector sleeve 762 moves the selector sleeve 762 along the axis of shaft 724 into a first position, a second position, or a neutral position. In response to a signal sent by a controller, an actuator adjusts a position of the selector sleeve 762.

In some embodiments, a clutch can be used instead of the shift fork 764. The clutch can be, but is not limited to, a dog clutch, a clone clutch, a wet or dry clutch including a hydraulically actuated wet clutch pack.

Gear set 792 is drivingly connected to a gear 708 of a gear pass 712. Gear 708 engages with gear 710 of gear pass 712. Gear 710 is rotatably mounted on a rotatable shaft 714. Shaft 714 additionally has a gear 718 of a gear pass 722 rotatably mounted thereon. Gear 718 engages with gear 720 of gear pass 722. Shaft 714 is selectively connected to the differential assembly 732 via the axle disconnect clutch 790.

In some embodiments, gear set 792 has a portion thereof grounded to a stationary member.

In some embodiments, the shaft 714 is drivingly connected to a differential carrier of the differential assembly 732.

If a low vehicle speed, low ratio range is desired the selector spline 760 is engaged with gear 720. The power is transferred from the motor/generator 702 through the first planetary gear set 780, shaft 724, through the selector spline 760 to gear pass 722 and to shaft 714.

If the clutch 790 is engaged, power will transfer to the differential assembly 732 and thus, to the wheels 744a, 744b.

If a high vehicle speed, low ratio range is desired, the selector spline 760 is engaged with 792. Power is transferred through shaft, planetary gear set 780 to shaft 724 to gear pass 712 to shaft 714.

If the clutch 790 is engaged, the power will transfer to the differential assembly 732 and thus, to the wheels 744a, 744b.

At certain desired road speeds the selector sleeve 762 can be in a neutral position wherein no power will be transferred to the wheels 744a, 744b of the vehicle.

In some embodiments, the axle half shafts may also be by an axle disconnect device (not shown) stopping all rotation from shaft 714 up to and including the electric motor/generator 702.

Figure 9:
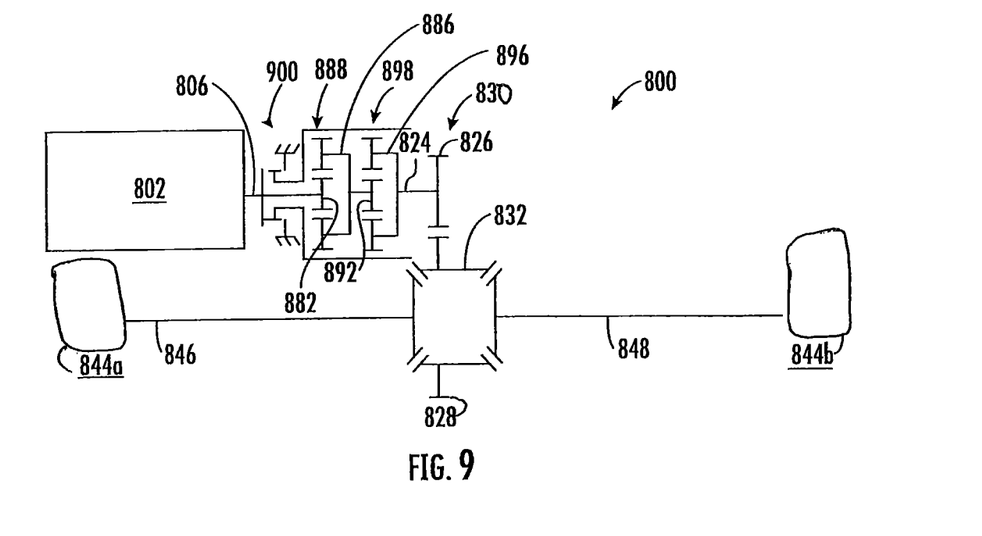
FIG. 9 is a schematic view of another preferred embodiment of an electric axle.

FIG. 9 depicts another preferred embodiment an electric axle 800. The embodiment shown in FIG. 9 includes similar components to the axle 700. Similar features of the embodiment shown in FIG. 8 are numbered similarly in series. Different and additional features of the variation shown in FIG. 9 are described hereinbelow and can be appreciated by one skilled in the art in view of FIG. 8 and the other embodiments illustrated and described in this disclosure.

Referring to FIG. 9, in some embodiments, the electric axle 800 includes a drivetrain operably coupled to a differential assembly 832. The differential assembly 832 is operably coupled to axle half shaft 846, 848, configured to drive a set of vehicle wheels 844a, 844b on the ends thereof. The differential assembly 832 is drivingly connected to a gear pass 830.

In some embodiments, the differential assembly 832 includes a traditional bevel differential gear set implemented to transmit rotational power.

A first electric motor/generator 802 is drivingly connected a rotatable shaft 806. Shaft 806 is drivingly connected to a first planetary gear set 880.

In some embodiments, the first planetary gear set 880 including a sun gear 882, drivingly engaged to a set of planet gears 884, a carrier 886, and a ring gear 888 engaged by the planet gears 884.

In some embodiments, shaft 806 is drivingly connected to the sun gear 882.

The carrier 886 is drivingly connected to a second planetary gear set 890.

In some embodiments, the first planetary gear set 890 including a sun gear 892, drivingly engaged to a set of planet gears 894, a planet carrier 896, and a ring gear 898 engaged by the planet gears 894.

The planet carrier 894 is drivingly engaged with shaft 824. A gear 826 is rotatably mounted on shaft 814. Gear 826 is meshingly engaged with a gear 828. Gears 826 and 828 form gear pass 830.

In some embodiments, gear 828 is drivingly connected to a bevel gear of the differential assembly 832.

Shaft 806 has a shifting mechanism 860 positioned between the electric motor and the planetary gear sets 880, 890.

In some embodiments, the shift mechanism 860 is a dog clutch.

The clutch 860 is positioned to selectively couple shaft 806 and ring gears 888, 898 or selectively ground the ring gear 888, 898 to a stationary member 900. When the clutch 860 is in a neutral position the ring gear 888, 898 are not coupled to the shaft 806 nor the stationary member is engaged.

If a high vehicle speed, low ratio range is desired the clutch 860 couples the ring gears with the shaft 806. The power is transferred from the motor/generator 802 through shaft 806, the first planetary gear set 880, the second planetary gear set 890, through gear pass 822 and to the differential assembly 832 and, thus, to the wheels 844a, 844b through the drive axle.

If a low vehicle speed, high ratio range is desired, the ring gears 888, 898 are grounded. Power is transferred through shaft 806 to first planetary gear set 880 through the carrier 886 to the second planetary gear set 890 through to the gear pass 822, to the differential assembly 832 and thus, to the wheels 844a, 844b.

It should further be noted that the electric axles 100, 200, 300, 400, 500, 600, 700, 800 disclosed herein are optionally used as primary drive axles, second drive axles, or both.

FIGS. 10a-f depicts a motor vehicle 1000 including a tandem axle assembly 1002 with an electric-driven axle 1004. The electric axle (or electric-driven axle) can be any one of the electric axles 100, 200, 300, 400, 500, 600, 700, 800 disclosed above.

Figure 10A:
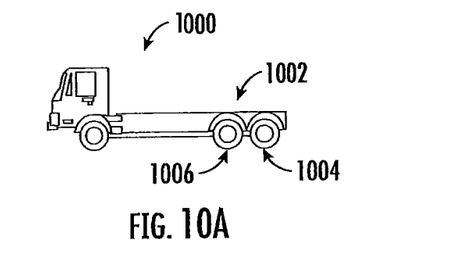
FIGS. 10a-f depict side views of a motor vehicle configuration incorporating an electric axle and an engine-driven axle.

In one arrangement for a motor vehicle as depicted in FIG. 10a, the electric driven axle 1004 is the second axle of the tandem axle assembly 1002 and the first axle 1006 is a conventional single axle driven by a power source, i.e. an internal combustion engine.

In some embodiments, the first axle 1006 has a fast gear ratio for example, but not limited to, greater than 2.5. The electric-driven axle 1004 supplements torque to the first axle 1006 when the first axle 1006 is not optimized.

Figure 10B:
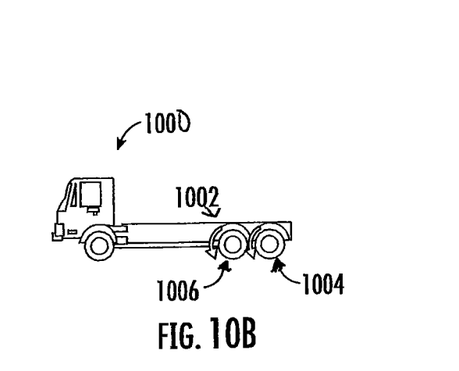

When the vehicle is operating at low or high speeds, as shown in FIG. 10b, both axles 1004, 10064 can be driven providing maximum torque and traction to the vehicle.

Figure 10C:
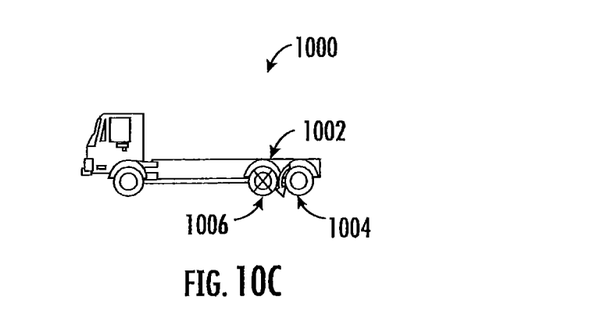

When the vehicle is operating at a low speed and the internal combustion engine can stop providing power to the engine-driven axle 1006, the electric-driven axle 1004 can be the only driven axle as depicted in FIG. 10c.

Figure 10D:
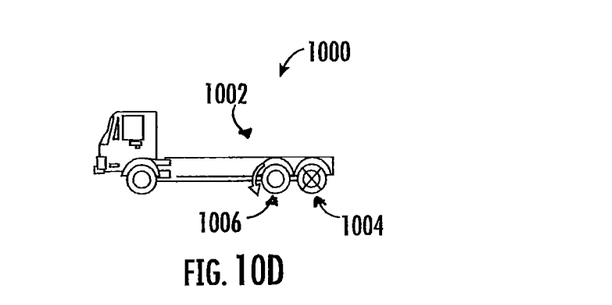

If the vehicle is operating at high speed, the electric-driven axle 1004 can be disengaged, leaving the engine-driven axle 1006 as the only driven axle. This increases efficiency, while keeping the disconnected electric-driven axle 1004 still rotating to maintain the same weight capacity as before, as depicted in FIG. 10d.

Figure 10E:
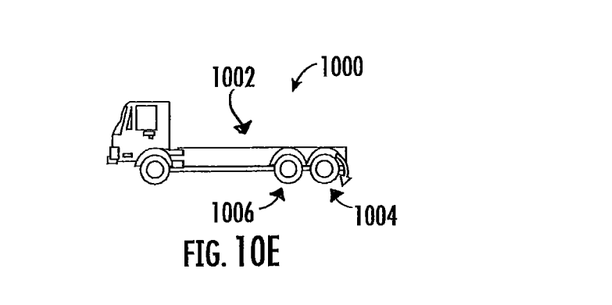

Additionally, the motor vehicle can use the electric-driven 1004 axle during regenerative braking as depicted in FIG. 10e. A friction braking system can be attached to each wheel of the electric-driven axle 1004. The electric-driven axle 1004 can be used to supplement the braking supplied by the friction braking system. Further, when the braking occurs, the energy can be used to charge the batteries attached to the motor vehicle, specifically to the batteries connected to the electric-driven motor vehicle.

Additionally as also depicted in FIG. 10e, the motor vehicle can use the electric-driven axle 1004 for through-the-road regeneration to charge the batteries attached to the motor vehicle, specifically to the batteries connected to the electric-driven motor vehicle, or other systems. Periods of through-the-road regeneration can be used to increase engine/fuel/electric motor/generator/battery overall system efficiency.

Additionally, the motor vehicle can use the electric-driven axle 1004 for supplemental power at high speeds to help boost power for short duration road gradients.

Figure 10F:
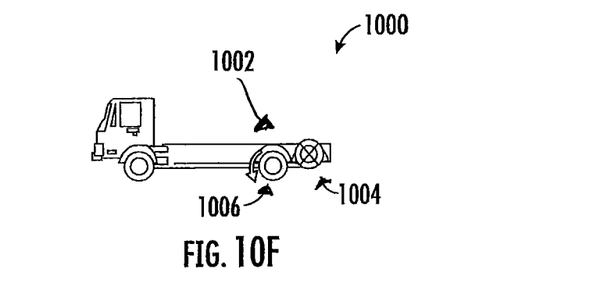

In some embodiments, the electric-driven axle 1004 may be connected to the tandem axle assembly 1002 via a lift system (not shown) such that it can be lifted during operation resulting in the wheels of the axle no longer making contact with the road. This results in the motor vehicle operating in essentially a 4×2 mode of operation as depicted in FIG. 10f. This mode of operation is suitable when the tandem axle assembly 1002 is supporting a light load to increase efficiency of the motor vehicle.

It should be understood that additional clutches/brakes, step ratios are optionally provided to the hybrid powertrains disclosed herein to obtain varying power path characteristics. Further, the over run clutches can be replaced with wet clutch packs. It should be noted that the connections of the electric machines to the power paths disclosed herein are provided for illustrative example and it is within a designer's means to couple the electric machines to other components of the powertrains disclosed herein.

The motor/generators described herein are capable of representing hydromotors actuated by variable displacement pumps, electric machines, or any other form of rotary power such as pneumatic motors driven by pneumatic pumps. In some embodiments, the electric motor/generators can be, for example, but not limited to, 169 Nm torque 48V motors While the preferred embodiments have been shown and described herein, it will be obvious to those skilled in the art that such embodiments are provided by way of example only. Numerous variations, changes, and substitutions will now occur to those skilled in the art without departing from the embodiments. It should be understood that various alternatives to the embodiments described herein are capable of being employed in practicing the embodiments.

Various embodiments as described herein are provided in the Aspects below:

Aspect 1. An electric axle comprising: a differential assembly drivingly connected to a first axle half shaft and a second axle half shaft, wherein the first and second axle half shafts each have a wheel coupled to the ends thereof; an electric motor/generator drivingly connected to a first rotatable shaft; a first gear set having a first gear connected to the first rotatable shaft and a second gear connected to a second rotatable shaft; a second gear set having a first gear connected to the second rotatable shaft and a second gear selectively connected to a third rotatable shaft; a third gear set having a first gear connected to the third rotatable shaft and a second gear drivingly connected to the differential assembly; and a selector device configured to selectively connect the third rotatable shaft to the second gear of the second gear set or the first rotatable shaft.

Aspect 2. The electric axle of Aspect 1, wherein the first rotatable shaft is transverse to the first and second axle half shafts.

Aspect 3. The electric axle of one of Aspects 1-2 further comprising an axle disconnect device rotatably mounted to one of the first and second axle half shafts between the differential assembly and the wheel.

Aspect 4. The electric axle of one of Aspects 1-3, wherein the first gear set, second gear set and third gear set are reducing gear sets.

Aspect 5. The electric axle of one of Aspects 1-4 further comprising at least one over run clutches positioned on one of first and second axle haft shafts, between the differential assembly and the wheel on the end thereof.

Aspect 6. The electric axle of one of Aspects 1-5, wherein the first gear set, second gear set, third gear set and differential assembly are enclosed in a clamshell housing, wherein the first and second axle half shafts extend through the clamshell housing.

Aspect 7. The electric axle of one of Aspects 1-6, wherein at least one of the first, second and third gear sets is an epicyclic gear set.

Aspect 8. The electric axle of one of Aspects 1-7, wherein at least one of the first, second and third gear sets is a stepped gear set.

Aspect 9. The electric axle of one of Aspects 1-8, wherein the selector device includes a selector spline connected to the third rotatable shaft and a selector sleeve, wherein the selector sleeve is configured to engage the selector spline and one of the first rotatable shaft and the second gear of the second gear set.

Aspect 10. A tandem axle assembly comprising: a first driven axle, wherein the first driven axle is drivingly connected to an internal combustion engine; and a second driven axle, wherein the second driven axle is one of the electric axles of Aspects 1-9.

The invention claimed is:
1. An electric axle assembly, comprising:
a first motor/generator permanently connected to an end of a first rotatable shaft having selector splines therein;
a second motor/generator permanently connected to an end of said first rotatable shaft opposite said first motor/generator;
a first gear pass having a first gear and a second gear;
a second rotatable shaft;
  wherein said second rotatable shaft extends co-axially with said first rotatable shaft;
  wherein at least a portion of said first gear of said first gear pass is drivingly connected to at least a portion of said second rotatable shaft;
a second gear pass having a first gear and a second gear;
a third rotatable shaft;
  wherein said third rotatable shaft extends co-axially with said first rotatable shaft;
  wherein at least a portion of said first gear of said second gear pass is drivingly connected to at least a portion of said third rotatable shaft;
a fourth rotatable shaft;
  wherein said fourth rotatable shaft extends parallel to said first rotatable shaft, said second rotatable shaft, and said third rotatable shaft;
  wherein at least a portion of said second gear of said first gear pass is drivingly connected to at least a portion of said fourth rotatable shaft;
  wherein at least a portion of said second gear of said second gear pass is drivingly connected to at least a portion of said fourth rotatable shaft;
a third gear pass having a first gear and a second gear;
  wherein at least a portion of said first gear of said third gear pass is drivingly connected to at least a portion of said third rotatable shaft;
  wherein at least a portion of said second gear of said third gear pass is drivingly connected to at least a portion of a differential assembly;
  wherein at least a portion of said differential assembly is drivingly connected to a first axle half shaft and a second axle half shaft;
a selector sleeve having a first position and a second position;
  wherein in said first position said selector sleeve is meshingly engaged with said selector splines on said first rotatable shaft and a plurality of splines on said second rotatable shaft thereby drivingly connecting said first rotatable shaft to said differential assembly through said first gear pass, said second gear pass, and said third gear pass; and
  wherein in said second position said selector sleeve is meshingly engaged with said selector splines on said first rotatable shaft and a plurality of splines on said third rotatable shaft thereby drivingly connecting said first rotatable shaft to said differential assembly through said third gear pass.

2. The electric axle assembly of claim 1, wherein said second rotatable shaft has a hollow portion and said third rotatable shaft has a hollow portion; and
wherein said hollow portion of said second rotatable shaft and said hollow portion of said third rotatable shaft have a size and shape to receive at least a portion of said first rotatable shaft therein.

3. The electric axle assembly of claim 1, wherein said first rotatable shaft, said second rotatable shaft, said third rotatable shaft and said fourth rotatable shaft extend transvers to said first axle half shaft and said second axle half shaft.

4. The electric axle assembly of claim 1, wherein said fourth rotatable shaft extends co-axial with said first axle half shaft.

5. The electric axle assembly of claim 1, wherein said fourth rotatable shaft has a hollow portion; and
wherein said hollow portion of said fourth rotatable shaft has a size and shape to receive at least a portion of said first axle half shaft therein.

6. The electric axle assembly of claim 1, wherein said first motor/generator and said second motor/generator are disposed on opposing sides of said differential assembly.

7. The electric axle assembly of claim 1, further comprising an axle disconnect device connected to said first axle half shaft or said second axle half shaft.

8. The electric axle assembly of claim 1, further comprising an over run clutch drivingly connected to at least a portion of said third rotatable shaft and said first gear of said second gear pass.

9. The electric axle assembly of claim 1, further comprising an over run clutch drivingly connected to at least a portion of said second rotatable shaft and said first gear of said first gear pass and/or at least a portion of said third rotatable shaft and said first gear of said second gear pass.

\* \* \* \* \*